(12) United States Patent
Bordes et al.

(10) Patent No.: US 6,909,747 B2
(45) Date of Patent: Jun. 21, 2005

(54) PROCESS AND DEVICE FOR CODING VIDEO IMAGES

(75) Inventors: Philippe Bordes, Pont-Pean (FR); Philippe Guillotel, Vern sur Seiche (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 725 days.

(21) Appl. No.: 09/808,463

(22) Filed: Mar. 14, 2001

(65) Prior Publication Data

US 2001/0024471 A1 Sep. 27, 2001

(30) Foreign Application Priority Data

Mar. 15, 2000 (FR) .......................................... 00 03309

(51) Int. Cl.⁷ ................................................. H04N 7/12
(52) U.S. Cl. ................... 375/240.12; 382/242; 348/554
(58) Field of Search ....................... 375/240.12, 240.08, 375/240.09, 240.01; 382/242, 203, 235, 154, 107; 345/419; 709/217; 348/554, 385.1, 397.1–398

(56) References Cited

U.S. PATENT DOCUMENTS

| 6,055,330 | A | * | 4/2000 | Eleftheriadis et al. | ...... 382/154 |
| 6,092,107 | A | * | 7/2000 | Eleftheriadis et al. | ...... 709/217 |
| 6,377,309 | B1 | * | 4/2002 | Ito et al. | ...................... 348/554 |
| 6,611,262 | B1 | * | 8/2003 | Suzuki | ........................ 345/419 |
| 6,643,387 | B1 | * | 11/2003 | Sethuraman et al. | ........ 382/107 |
| 6,678,416 | B1 | * | 1/2004 | Sun et al. | .................... 382/235 |

FOREIGN PATENT DOCUMENTS

| EP | 0771119 A2 | 5/1997 | ............ H04N/7/50 |
| EP | 0909096 A1 | 4/1999 | ............ H04N/7/24 |
| EP | 0961496 A2 | 12/1999 | ............ H04N/7/26 |

OTHER PUBLICATIONS

French Search Report dated: Nov. 16, 2000.

* cited by examiner

*Primary Examiner*—Gims Philippe
(74) *Attorney, Agent, or Firm*—Joseph S. Tripoli; Ronald H. Kurdyla; Guy H. Eriksen

(57) ABSTRACT

A process and device for coding video images using a non object-based coding standard that extracts at least one video object from an image originating from a sequence of images, by the construction of a segmentation key defining the contours of the object in the image. The video object is coded according to the MPEG 2 standard so as to form an elementary stream (ES). The segmentation key relating to the video object is coded according to the MPEG 2 standard, so as to form an elementary stream. A background image into which the object is to be inserted is coded according to the MPEG 2 standard, so as to form an elementary stream. The elementary streams relating to one or more objects and to the background image are multiplexed so as to provide a program stream (PS) or transport stream (TS) according to the MPEG 2 standard.

13 Claims, 3 Drawing Sheets

 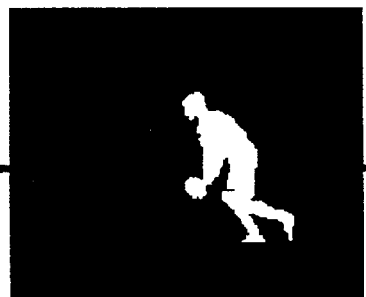 
FIG.2a FIG.2b FIG.2c
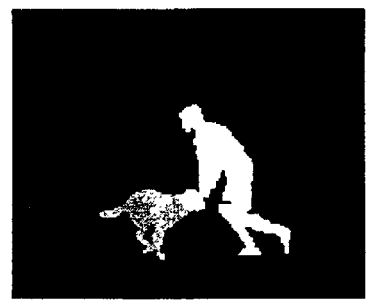
FIG.2d
FIG.2e

PROCESS AND DEVICE FOR CODING VIDEO IMAGES

FIELD OF THE INVENTION

The present invention relates to an MPEG 2 compatible object based coding process.

BACKGROUND OF THE INVENTION

The MPEG 4 standard relates to the coding of audiovisual objects for scene composition. The advantages of separate coding of the objects are known. For example, better data compression is obtained owing to the segmentation of the images making it possible to code with an image quality which is dependent on the zones of interest or to store the coding data of objects at the coder level, avoiding the retransmission of the corresponding data. Also, it is possible to construct scenes with great flexibility, which scenes can be created or modified at the coder level independently of the information received.

The MPEG 2 type coding and decoding circuits, according to the prior art, do not make it possible to utilize video objects and hence do not allow a scene to be composed in a simple and flexible manner as in the MPEG 4 standard.

SUMMARY OF THE INVENTION

The aim of the invention is to alleviate the aforesaid drawback.

Its subject is a process for coding video images, characterized in that it comprises:

- a step of extraction of at least one video object from an image originating from a sequence of images, by the construction of a segmentation key defining the contours of the object in the image,
- a step of coding the video object according to the MPEG 2 standard so as to form an elementary stream (ES),
- a step of coding the segmentation key relating to the video object, according to the MPEG 2 standard, so as to form an elementary stream,
- a step of coding a background image into which the object is to be inserted, according to the MPEG 2 standard, so as to form an elementary stream,
- a step of multiplexing the elementary streams relating to one or more objects and to the background image so as to provide a programme stream (PS) or transport stream (TS) according to the MPEG 2 standard.

According to a particular embodiment, the process comprises an additional step of calculating a depth map defining the relative positioning of the video objects in terms of depth and in that this map is coded according to the MPEG 2 standard so as to provide an elementary stream multiplexed with the other elementary streams so as to be transmitted in the data transport stream.

According to a particular embodiment, the depth map is obtained from information originating from a camera providing video images to be coded.

According to a particular embodiment, the coding of the video object is performed by coding the complete image, using only the DC coefficients for the coding of parts of the image other than the object.

According to a particular embodiment, the coding of the video object is performed by coding the complete image, the mode of coding the background being forced in such a way as to reduce the number of coding bits.

According to a particular embodiment, in the case of a uniform background, the coding of the background is performed using only the DC coefficients. The latter being equal, the cost of coding the background is then very low. The process remains valid for a nonuniform background but with a higher cost in terms of bit rate.

According to a particular embodiment, macroblocks relating to the background of the image are detected on the basis of the segmentation key and in that the "skipped macroblocks" mode of the MPEG 2 standard is forced for the coding of these macroblocks.

The invention also relates to a coding device for implementing the process according to claim 1, characterized in that it comprises an object extraction circuit for providing a segmentation key defining the borders of the object, a circuit for MPEG coding of the texture of the video object, a circuit for MPEG coding of the segmentation key, a circuit for MPEG coding of a background image so as to provide elementary streams, at least one circuit for multiplexing the elementary streams so as to provide a programme stream or transport stream.

The invention also relates to a programme stream or data transport stream according to the MPEG 2 standard, characterized in that it comprises an elementary stream for the coding of an object, an elementary stream for the coding of a background, an elementary stream for the coding of a segmentation key defining this object.

The invention consists in using the MPEG 2 multiplexed stream or transport stream to transmit audiovisual objects separately. The MPEG 2 transport stream transmits several image sequences, each corresponding to one or more elements of the scene, for example a background, an object, a person, which have been extracted from the original scene before coding. It is thus possible to change an object or to modify the background of the scene in a very simple way, each of these elements relating to a specific MPEG 2 data "programme".

The main advantage of the invention is that it makes it possible, while still utilizing conventional MPEG 2 type coders and decoders, to build, in a flexible, easy and inexpensive manner, image sequences representing scenes composed from data transmitted in an MPEG 2 transport stream.

The creation of a scene from MPEG 2 data or the modifying of the content of the scene transmitted is made easier, for example the insertion of advertisements targeted on the basis of regions, customers, etc.

Another advantage relates to the image quality since it is then possible to share the cost of coding an image, for example between the objects and the background of the image and thus to improve the quality of coding of the objects of interest to the detriment of the background, these objects being properly identified. For example, the block effects between the background and the object may be attenuated.

The increase in bit rate due to the transmitting of the data relating to the additional elementary streams is compensated for by better compression of the decomposed images, objects of each of these streams.

BRIEF DESCRIPTION OF THE DRAWINGS

The characteristics and advantages of the present invention will emerge more clearly from the following description given by way of example and with reference to the appended figures, where FIG. 2 represents an example of scene creation utilizing the depth map.

DETAILED DESCRIPTION OF PREFERRED EMBODIMENTS

Within the context of the MPEG 2 standard, the video objects are not defined a priori, that is to say in respect of coding, as in the MPEG 4 standard. The invention proposes the utilization of a technique for segmenting the image, for example that based on chrominance and known as chromakey, to define and extract image objects.

The "chromakey" technique is commonly used in production for the composition of scenes, for example for virtual studios. The presenter moves around a virtual set, this background or set being a 3D synthetic image. This technique is briefly recalled hereinbelow with regard to FIGS. 1a, 1b, 1c, 1d.

Figures 1A, 1B, 1C, 1D:
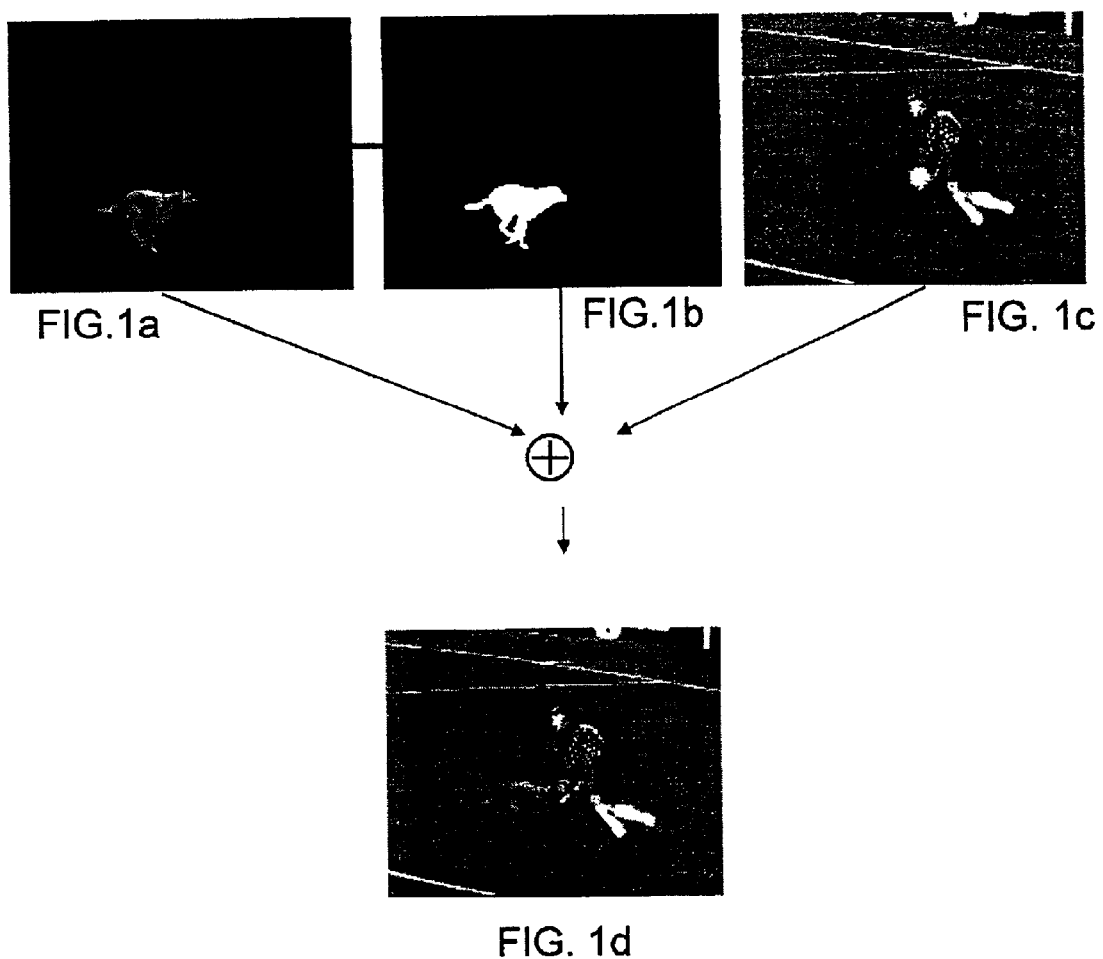
FIG. 1 represents an example of scene creation on the basis of the "chromakey" technique.
Figure 3:
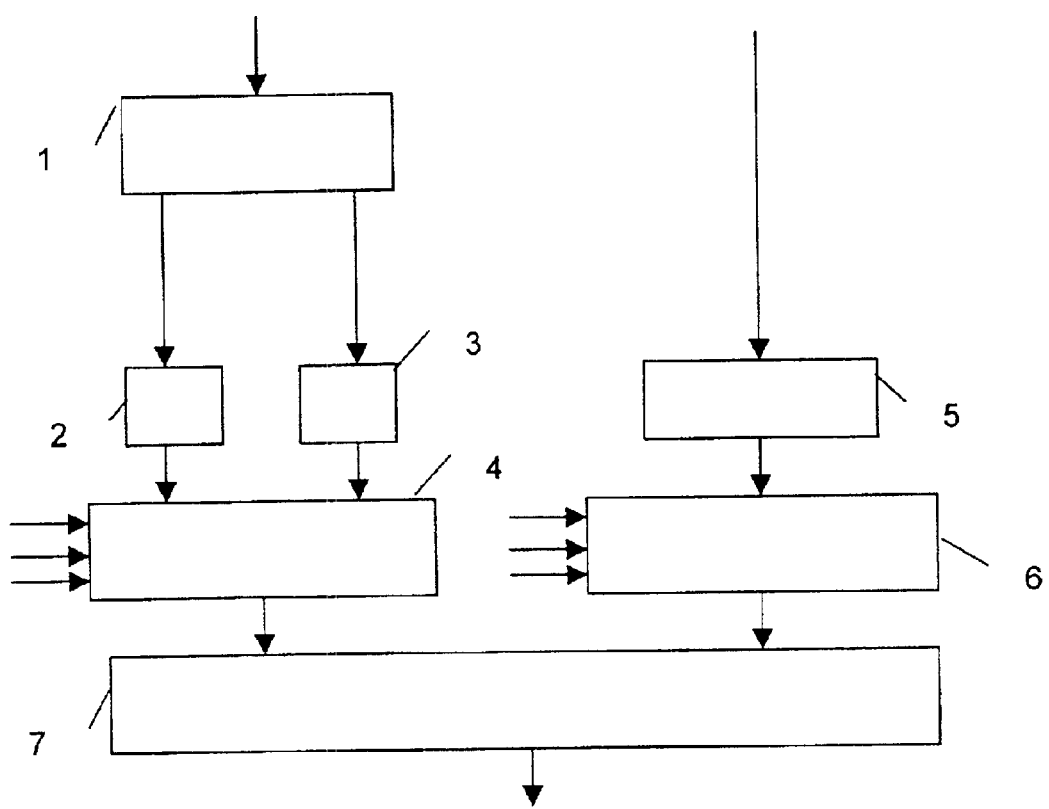
FIG. 3 represents a device for multiplexing the elementary streams for the construction of a transport stream according to the invention.

FIG. 1a represents an image consisting of a blue background and a video "object", here a dog, in the foreground. By virtue of a filtering on the colours, the object is isolated from the background. An image 1b called the clipping key or segmentation key or the α plane is thus created.

The image 1c corresponds to the new background which one wishes to substitute for the blue background.

The image represented in FIG. 1d is the superposition of the object on this background. This superposition or more exactly this mixing is carried out for example by calculating the luminance/chrominance of the new image in accordance with the following equation:

$$\alpha \cdot a + (1-\alpha) \cdot c$$

in which:

α represents the grey level of the image 1b (for example luminance value divided by 255), also called transparency "a" and "c" respectively represent the luminance/chrominance of the image 1a and 1c.

An intermediate grey level is generally calculated for the border zones between the object and the background, for the segmentation key, so as to avoid overly abrupt transitions. This segmentation key is very easy to obtain when the object is a virtual object.

The MPEG 2 transport stream, in accordance with the invention, is created from the elementary streams relating to each of the images 1a, 1b, 1c. It is then possible, at reception level, to place an object, here the dog, in front of a background. This background is not however necessarily that transmitted in the stream and can be obtained elsewhere.

If only the data relating to the segmentation key is transmitted, in addition to the texture information for the objects and for the background, the placing of an object in an intermediate depth is not possible.

A variant of the invention consists in adding, to the transport stream, a depth cue, thus making it possible to solve this problem. A coding of an image called the depth map or z-plane is carried out and the corresponding elementary data stream is transmitted in the transport stream. Grey levels of these images represent the relative depth of the corresponding pixels of the associated images.

An example of scene construction which takes into account a depth map is represented in FIG. 2.

FIGS. 1a and 1b respectively represent a first video object, a dog, and the corresponding segmentation key. FIG. 2a represents an original image, from which is obtained FIG. 2b which is the segmentation key of another video object which is here a player. This segmentation key is obtained with a process other than "chromakey", namely by segmentation. FIG. 2c, where the background has been replaced with the blue of the chromakey, so as to minimize the coding cost, gives the corresponding texture of this other object. FIG. 2d represents the depth map for the two objects and FIG. 2e the recomposed scene. In FIG. 2d, the brightness level is representative of the depth. Thus, the object in white (the player) corresponds to the minimum depth, the object in grey (the dog) to an intermediate depth and the background in black to the maximum depth.

In FIG. 2e, the head of the dog is partially hidden by the player showing that the dog is positioned, depthwise, between the player object and the playing pitch background.

The means for obtaining a depth map belong to the known art. For example, it is possible to utilize laser radiation coupled to a camera to measure the distance of the objects and people making up the scene and to provide a corresponding depth image.

The scene obtained by this utilization of a depth map is referred to as "2D +" or "pseudo 3D".

The construction of the scene requires the creation of six elementary data streams, three relating to the texture of the dog, of the player and of the background, two relating to the segmentation keys of the dog and of the player, one relating to the depth map of the complete scene.

By virtue of the additional information relating to the depth, it is possible to move objects in front of other objects or behind, partially or completely by utilizing each of the elementary data streams.

In order to compensate for or at least limit the additional bit rate due to object based coding, the coding of the images to be transmitted can be optimized at cost level, as indicated hereinbelow.

If one considers groups of images (or GOP standing for Group Of Pictures in the MPEG 2 standard) of intra type, the coding of the blue background is performed by use of the DC coefficients alone. It is not in fact necessary to transmit the other frequency coefficients because a background image of good quality is not necessary when the segmentation key is available. Moreover, all these coefficients can be forced to the same value so that the prediction of the DC coefficient is perfect; the coding cost is then a minimum. When coding the image, these macroblocks are detected on the basis of the segmentation key.

As far as this segmentation key and the images relating to the texture of the video objects are concerned, a certain image quality level is desired in order to represent these objects which are assumed to be points of interest of the scene and in order to define their borders with good accuracy. Thus, flat weighting matrices are used to favour the high-frequency coefficients. The cost of coding the segmentation image is generally lower than the cost of coding the objects since it involves coding very homogeneous grey levels.

If temporal compression is utilized, that is to say if the groups of pictures comprise images coded in inter mode, of B and/or P type, then the "skipped macroblocks" mode in the standard is utilized for the coding of the uniform or stationary background, which mode requires few coding bits. Likewise, for the corresponding macroblocks of the segmentation key and of the texture image of the object.

If the background is neither uniform nor stationary and in the case where the displacement is uniform, the displacement vector of all the macroblocks is forced to this displacement value and the prediction error to be coded is forced to zero.

In the other cases, no forcing is used, the coding is of the conventional type.

In general, the sharing of the coding data favours the objects to the detriment of the background, the point of interest generally being the video object or objects. According to known principles, the motion may also be taken into account to determine the coding cost to be assigned to the various objects. Of course, the segmentation of the object is bound up with the MPEG coding, that is to say with the chopping of the image into macroblocks.

Such codings make it possible to transmit GOPs consisting of intra images, for the coding of the segmentation key and the texture image of the objects, at bit rates of the order of 50 Mbits/s in intra mode or, if bidirectional type interceding is used, bit rates of the order of 18 Mbits/s. These GOP structures and these bit rates are those customarily used for images of studio quality.

The bit rate monitoring can be designed in such a way as to guarantee transmission at a constant bit rate for the entire transmission, whilst allowing a variable bit rate between the various channels of the multiplex. For example, the image relating to the segmentation key can be coded with better quality than the texture and the bit rate can be allotted adaptively to the various elementary streams as a function of the relative complexity of the images to be coded or of the semantic importance accorded to one object relative to the others.

FIG. 4 represents an MPEG 2 multiplexing device implementing the process according to the invention.

A data stream representing a first image sequence is transmitted to the input of an object extraction circuit 1. On a first output of this circuit, data relating to the contour of the object to be extracted (α plane) are available for transmission to the input of an MPEG 2 coding circuit 2. On a second output of this circuit 1, data relating to the texture of the object to be extracted are available for transmission to the input of an MPEG 2 coding circuit 3. The elementary streams ES (as they are known in the MPEG 2 standard) at the output of the coders 2 and 3 are transmitted to the first and second inputs of a stream multiplexing circuit 4. This circuit also receives, on a third input, a corresponding audio elementary train (the audio MPEG coder is not represented in the figure) and, on auxiliary inputs, the private data, the service information, the conditional access commands, the clocks, in accordance with the standard to which reference may be made for further information regarding these signals.

A second data stream representing a second sequence is transmitted to a third MPEG 2 coder 5 for the coding of images representing the background of the sequence to be reconstructed. The output of the video coder 5 transmits the video elementary stream to a first input of a second multiplexer 6, the audio elementary stream (audio MPEG coder not represented in the figure) being transmitted to a second input, the private data, the service information, the conditional access commands, the clocks being transmitted to auxiliary inputs.

The outputs of the multiplexing circuits 4 and 6 which represent the various MPEG 2 programmes are transmitted to the inputs of a third multiplexer 7 whose output is the transport stream TS.

In this example, a first multiplexer is therefore assigned to the coding of an object and a second multiplexer to the coding of the background. The programmes exiting each of the multiplexers 4 and 6, which consist of the elementary streams, are then multiplexed by way of the multiplexer 7, so as to provide the transport stream (TS).

A depth map can also be transmitted in the transport stream. In addition to the elementary stream defining the segmentation image, that is to say the objects selected within the image, an MPEG elementary stream defining the depth map, that is to say the respective position of the objects in terms of depth, is then associated with a texture stream defining one or more objects. This elementary stream is transmitted to the input of the multiplexing circuit 7 so as to provide another programme.

The various channels constructed from the elementary streams, for one and the same programme, are thus synchronized perfectly with one another, the PCR clock and the DTS and PTS labels are the same (terms defined in the MPEG standard). A packet identifier PID (as it is known in the MPEG standard) is chosen to be different for each of the channels so as to make it possible to distinguish them within the same multiplex.

Of course, objects from different image sequences can be selected. In this case, another multiplexer can be used to provide a programme comprising the data relating to this other sequence, that is to say the texture of the object, the segmentation key and the depth map corresponding to the video object of this other sequence. The depth map can take this new object and the previous ones into account. The transport stream is obtained by multiplexing this stream with the previous ones.

The texture elementary stream for the object can be the coding of the original sequence, for example the sequence corresponding to FIG. 1a, the coding of the blue background being of very low cost.

The previous example describes the building of a transport stream (TS) from two programmes. Consideration may also be given to the building of a simple programme stream (PS), for example for the storage of data, or else to the building of a transport stream from several programme streams or several transport streams.

A variant of the invention consists in not transmitting the information relating to the segmentation key. This information is then recalculated on receiving the other data. In this case, referring to FIG. 1, only the images 1a and 1c are transmitted and the image 1b is recalculated on reception. This solution makes it possible to decrease the cost of coding the information to be transmitted and/or to improve the quality of the images transmitted for a given transmission bit rate. However, it may be noted that the cost of coding the segmentation key is not generally very great.

The MPEG coder used to obtain the elementary streams is a basic MPEG 2 coder, preferably optimized so as to decrease the coding costs. For example, a forcing is performed when coding the background, if in inter mode, so as to impose the skipping of macroblocks and thus decrease this coding cost in the uniform or stationary background case. The weighting matrices selected are flat matrices.

An advantage of the device described relates to the chromakey operations which are carried out on the production site, that is to say at the camera exit. Thus, the making of different scene compositions, utilizing extracted video objects, is possible without the need for new chromakey operations.

The invention is not limited solely to the known techniques of chromakey for extracting contours, such as the use of blue coloured backgrounds. The utilization of specific cameras or the recording of parameters of the camera so as to extract the segmentation plane or the depth map also forms part of the field of the invention.

Applications relate to studios, for example virtual studios and also video transmission.

What is claimed:

1. Process for coding video images according to a non object-based coding standard, said process comprising:
a step of extraction (1) of at least one video object from an image originating from a sequence of images, by the construction of a segmentation key defining the contours of the object in the image,
a step of coding (2) the video object according to said standard so as to form an elementary stream (ES),
a step of coding (3) the segmentation key relating to the video object, according to said standard, so as to form an elementary stream,
a step of coding (5) a background image into which the object is to be inserted, according to said standard, so as to form an elementary stream,
a step of multiplexing (4, 6, 7) the elementary streams relating to one or more objects and to the background image so as to provide a programme stream (PS) or transport stream (TS) according to said standard.

2. Process according to claim 1, said process comprising an additional step of calculating a depth map defining the relative positioning of the video objects in terms of depth, wherein said depth map is coded according to said standard so as to provide an elementary stream multiplexed with the other elementary streams so as to be transmitted in the data transport stream.

3. Process according to claim 2, wherein said depth map is obtained from information originating from a camera providing video images to be coded.

4. Process according to claim 1, wherein said coding of the video object is performed by coding the complete image, using only the DC coefficients for the coding of parts of the image other than the object.

5. Process according to claim 1, wherein said coding of the video object is performed by coding the complete image, the coding mode for coding the background of the complete image being forced in such a way as to reduce the number of coding bits.

6. Process according to claim 5, wherein, in the case of a uniform background, said coding mode for coding the background uses only the DC coefficients.

7. Process according to claim 5, wherein macroblocks relating to the background of the image are detected on the basis of the segmentation key and wherein the "skipped macroblocks" mode of the MPEG 2 standard referenced ISO/IEC 13818-2:1996(E) is forced for the coding of the temporally stationary macroblocks.

8. Process according to claim 5, wherein macroblocks relating to the background of the image are detected on the basis of the segmentation key and wherein the predictive modes of the MPEG 2 standard referenced ISO/IEC 13818-2:1996(E) are used for the coding of the temporally mobile macroblocks, by forcing the motion vectors to the same value and the prediction residual to zero.

9. Coding device for implementing the process according to claim 1, said device comprising an object extraction circuit (1) for providing a segmentation key defining the borders of the object, a non object-based circuit for coding (3) of the texture of the video object, a non object-based circuit for coding of the segmentation key (2), a circuit for MPEG coding of a background image (5) so as to provide elementary streams, at least one circuit (4, 6, 7) for multiplexing the elementary streams so as to provide a programme stream (PS) or transport stream (TS).

10. Program stream (PS) or transport stream (TS) according to a non object-based coding standard, such stream comprising an elementary stream (ES) for the coding of a video object, an elementary stream for the coding of a background image, an elementary stream for the coding of a segmentation key defining this video object.

11. The process according to claim 4, wherein said step of coding the complete image comprises an image being split into blocks and blocks being coded using a Discrete Cosine Transformation giving DC and AC coefficients.

12. The process according to claim 5, wherein said step of coding the compete image comprises an image being split into blocks and blocks being coded using a Discrete Cosine Transformation giving DC and AC coefficients.

13. Apparatus for coding video images according to a non object-based coding standard, said apparatus comprising:
means for extraction of at least one video object from an image originating from a sequence of images, by the construction of a segmentation key defining the contours of the object in the image,
means for coding the video object according to said standard so as to form an elementary stream (ES),
means for coding the segmentation key relating to the video object, according to said standard, so as to form an elementary stream,
means for coding a background image into which the object is to be inserted, according to said standard, so as to form an elementary stream,
means for combining the elementary streams relating to one or more objects and to the background image so as to provide a programme stream (PS) or transport stream (TS) according to said standard.

* * * * *